Aug. 12, 1958  P. W. WAGNER  2,846,742
PATTERN AND METHOD OF MOLDING
Filed April 17, 1953  2 Sheets-Sheet 1
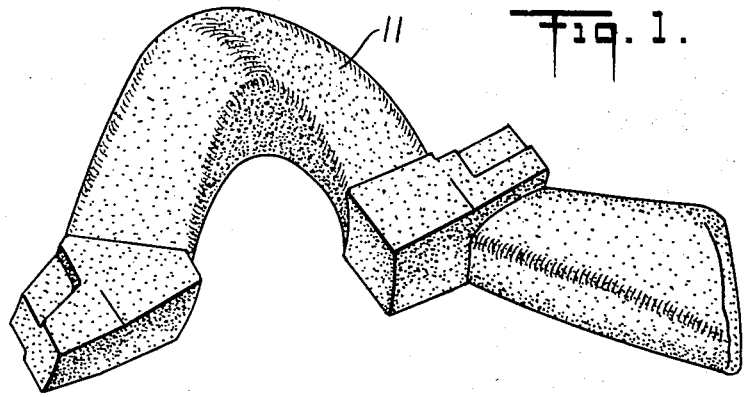
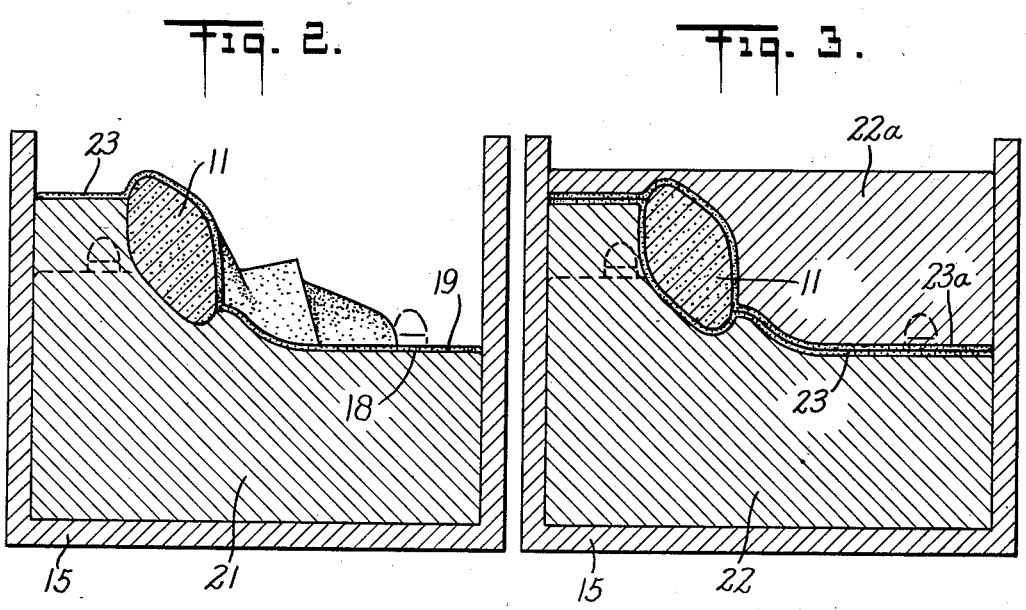
INVENTOR
Paul W. Wagner
BY
Curtis, Morris & Safford
ATTORNEYS

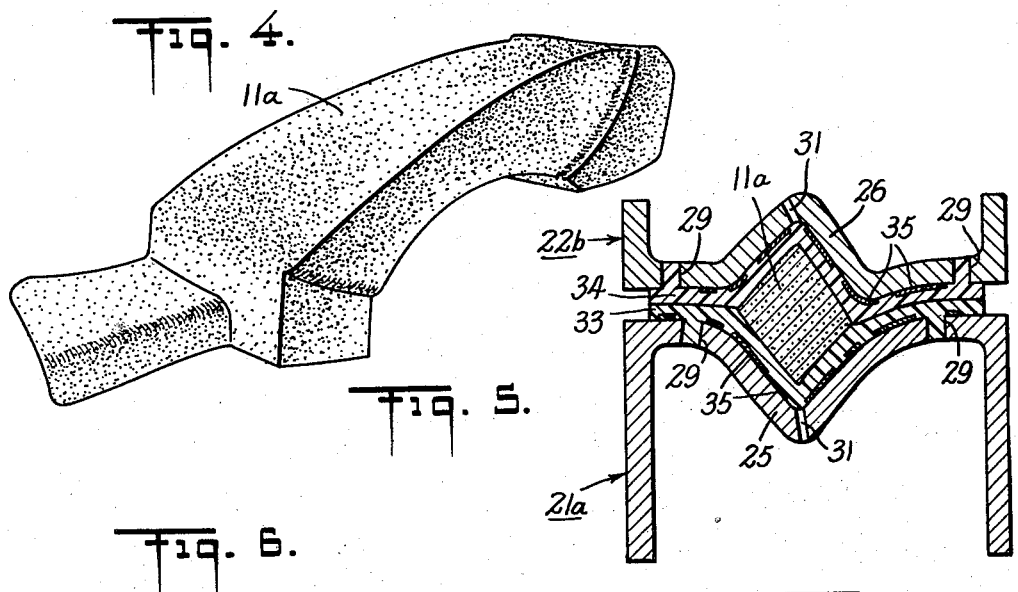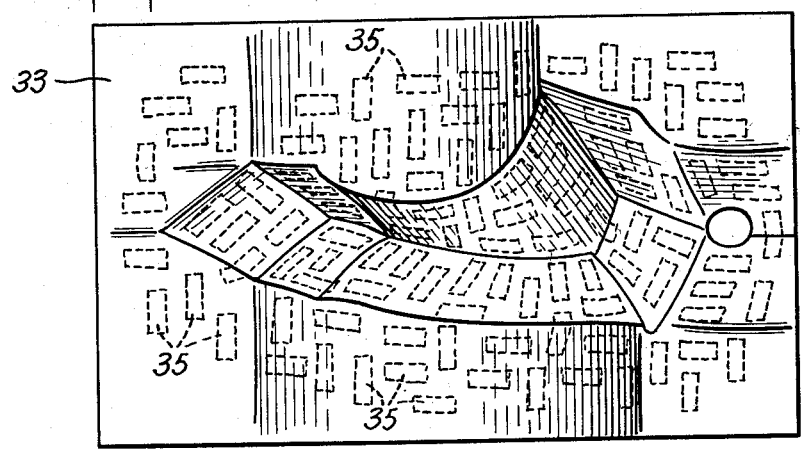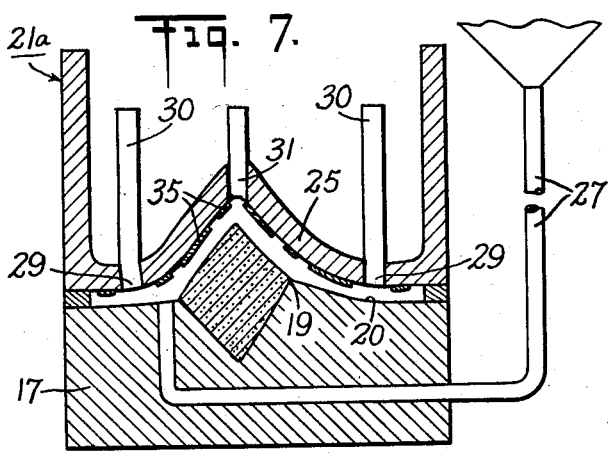

United States Patent Office 2,846,742
Patented Aug. 12, 1958

2,846,742

PATTERN AND METHOD OF MOLDING

Paul W. Wagner, Yellow Springs, Ohio, assignor to Morris Bean and Company, Yellow Springs, Ohio Application April 17, 1953, Serial No. 349,446

19 Claims. (Cl. 22—164)

This invention relates to molds, patterns, compositions therefor and the art of making molds and patterns for use in metal castings. More particularly the invention relates to permanent pattern equipment (including core boxes and the like, as well as those patterns which duplicate the entire form of a part to be cast). For simplicity we shall refer to all such devices for forming casting mold surfaces as "patterns," whether they are positive or negative, i. e., cameo or intaglio, male or female, surfaces.

In the molding art, typically a model or pattern to be reproduced or a negative thereof, is first made by hand. This model may be of clay, wood, plaster, plastic, metal or other rigid or resilient material. The pattern or negative impression is used to make either a master mold or a pattern which is employed for making a large number of mold impressions or patterns. For example, if it is desired to make a hollow structure by a casting technique, a core model would be made to conform to the inner contours of the hollow in the final product. A negative impression or core box would then be formed from the model and used to cast cores, e. g., in plaster of Paris which will form the metal on the interior of the piece, the plaster cores being ultimately destroyed when the casting is cleaned.

It is evident that dimensional fidelity is of greatest importance and that resistance to scratching, chipping, denting etc., are essential if such pattern equipment is to be capable of economical multiple use. The search is age old for a pattern material which will be at once easily formed, cheap, tough and wear-resistant and yet dimensionally stable so as to reproduce exactly the surface shapes and contours to be molded; yet the art still has had to rely upon such compromise materials as sand, plaster, rubber, etc. Vinyl plastics have been used, with advantages over the older pattern materials, but they cannot be relied upon for precise dimensional accuracy. The need for a good pattern material has continued.

Before describing my invention more specifically, it should be noted that the suggestion or description of specific embodiments of the invention or of certain modifications of the invention which I make hereafter is not intended to be exhaustive of my invention, but on the contrary is selected with a view to illustrating and explaining the invention, the principles thereof and the preferred manners of applying it in practical use in order that others skilled in the art may be enabled to practice the invention and apply it under various circumstances and in various ways, and with modifications, each as may be best suited to the conditions of a particular use.

In one of its broader aspects the invention may be said to lie in providing pattern equipment wherein the molding surfaces are formed by an epoxy resin, which is a polymer of the structural unit

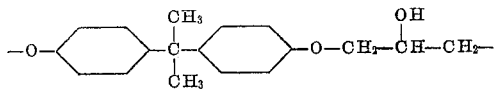

with terminal units

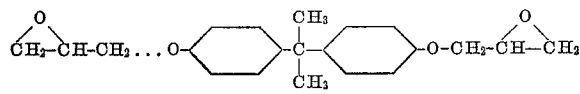

curing agents, fillers, and so on are added as required.

I have discovered that these epoxy resins alone or in combination with fillers, etc., can be used to form molding surfaces of patterns which are durable and wear resistant. However, the very tests which establish this fact also seemed thoroughly to indicate that they are not suitable for use as pattern materials because of their excessively high shrinkage. On a volume basis, they exhibit a total shrinkage of about 6% and when molded in ordinary molds the surface of the resin pulls away from the surface of the mold in irregularly shaped spots with definite boundaries, like the contour lines on a relief map, leaving depressions or cavities of irregular depth which are very objectionable and make the product useless as a pattern. Only a small part of this is thermal shrinkage; the major part is apparently due to the chemical reaction of setting. It is observed also that these resins when poured into a clean metal or plaster mold and allowed to set, adhere so tightly that they cannot be released. Another serious problem is the strongly exothermic character of the reaction by which the resin sets.

Notwithstanding the apparent unsuitability of this material, I have now demonstrated that pattern equipment which is most advantageous can be made of this material. When the epoxy resin is used according to this invention the shrinkage occurs in three stages: In the first stage the material is sufficiently liquid to flow readily; in the second stage the material has set so that it is no longer capable of free flow like a liquid, but it is capable of a plastic flow analagous to the "cold flow" exhibited by many solids; in the third stage the material is so far set that controlled flow in the molded resin is no longer feasible. According to this invention the major shrinkage is compensated for by liquid flow; and shrinkage in the plastic stage is accommodated according to my invention by distortion in the back of the pattern while its molding surface is held on the pattern mold.

Although the use of epoxy resin as herein set forth is in itself an invention for which patent is here claimed, in its broader aspect my invention is not limited to the particular type of resin, but relates to the control of shrinkage and the manner of using casting resins in general and especially those resins which have been used for "potting" electrical equipment, by which control and method these resins are made available for use in pattern equipment for metal foundries.

Adhesion according to the invention is controlled by release agents to hold the face of the pattern on the pattern mold or model while the shrinkage after setting is being accommodated by plastic flow elsewhere in the pattern. The accommodation by liquid flow may be kept at a maximum by controlling the setting in various parts of the resin so that the resin at the pattern surface and in parts most remote from the downpours and risers set up first and can accommodate its plastic stage shrinkage by sucking in still-liquid resin from adjacent parts. This proceeds progressively from face to back and from the larger parts of the cavity toward the risers and downpours in which the resin is kept liquid until the resin in the pattern has set.

Figure 1 is a perspective view of a particular model made of metal, plaster of Paris, or the like of a form required for a core for casting a hollow metal piece.

Figure 2 is a cross-sectional view of a frame containing a parting and the model of Figure 1 in place therein.

Figure 3 is a cross-sectional view of a complete core box.

Figure 4 is a perspective view of another form of a core.

Figure 5 is a cross-sectional view of the upper and lower parts of another core box embodying the invention wherein resinous mold layers are bonded to metal backings.

Figure 6 is a plan view of the lower half of the core box of Figure 5.

Figure 7 is a cross-sectional view of metal back for one half of the core box of Figure 6 assembled with a model and parting ready for molding the face layer.

Figures 1 through 3 show various stages in the formation of a massive core box from a resin composition.

A rigid model 11 (Figure 1) may be made of steel, plaster of Paris, clay or wood, etc., with its surface treated, e. g., with wax, to avoid adhesion by the resin.

The model 11 is cleaned and is coated with a parting agent unless it is made of a material, such as carnauba wax or certain polyethylene resin moldings which will itself release the resin pattern material. With impervious materials like metals, no other treatment is required, whereas with porous materials like plaster of Paris I find it desirable in many cases to seal the porous surface before waxing.

Thus using a plaster of Paris model, it is first cleaned to remove dirt, and any protective coating, and fully expose the true surface of the model. It is then thoroughly dried. The dry, clean model may next be sealed, e. g., by applying a liquid epoxy resin to the model surfaces with a stiff brush; if necessary, brushing is done several times until the plaster is thoroughly wet by the solution in order to get a good seal. Excess epoxy liquid is then wiped off so as to leave surface dimensions and contours unaffected.

A preferred epoxy liquid is comprised of 90 parts by weight of an epoxy casting resin such as that sold by Shell Chemical Company of San Francisco, California, under the trade name Epon 828, 10 parts of allyl glycidyl ether, 10 parts of diethylene triamine. Other curing agents may be used e. g., benzyl dimethylamine, triethyl amine or piperidine. This epoxy resin sealant is mixed for about 2–3 minutes in a vessel with a wooden paddle or other inert stirrer. The sealant is then applied to the model at room temperature (i. e., before any substantial heating) and within about 30 minutes of the mixing, and is soaked into the plaster surface as described above.

After thus sealing the model with the epoxy resin, the resin is cured. At room temperature and with the above composition, this requires about 14 hours. Increasing temperature has the effect of decreasing the curing time. Thus, at 150° F. the resin cures in about 2 to 6 hours, and at 200° F. it cures in about 1 to 2 hours. Larger models generally require more time for curing than smaller ones.

The resulting sealed model next has its significant faces coated with paste wax (advantageously carnauba wax) such as Johnson's paste wax and rubbed and recoated. It is important that the waxing be sufficient to assure release of the model, but on the other hand, the epoxy resin composition must adhere to the model while setting, in order to avoid shrink spots. The sealed and waxed model is then ready for contact with the epoxy casting resin.

Other release agents known for use with the particular resin may be used in my invention. With the particular Epon 828 resin, for example, I have used silicone grease applied in aqueous emulsion (available commercially under the trade name XEC 135A) by spraying or brushing onto the parting surface and the model.

Referring to Figure 2, a frame or open box 15 of somewhat greater dimensions than the model is set in place. In the bottom part of this frame a parting 21 is formed about the model so that the parting line 19 allows the model to be withdrawn from either part of the mold. The parting surface 18 may be filled as above described, if porous, and is treated with paste wax or other releasing agent in the same way as the model. Special attention must be given to seal off the contacting faces of model and parting by the release agent, as the epoxy resin will tend to creep in between them and bond them so securely that they could not be separated without damaging the model. Care must be used especially with inside corners; the entire model and parting surface should have a coating of wax or other release agent, but with no "build-up."

The wax should be allowed to air-dry for about one hour or more and then thoroughly but lightly polished with cotton. A second coat of wax applied over the thus-treated surfaces of the assembled model and parting is left unpolished.

The first step in forming the core box is, advantageously, to apply a thin layer 23, e. g., about $\frac{1}{16}''$ thick, of a facing composition over the release agent on the parting and model. This facing composition in the preferred example consists of:

| | Parts by weight |
|---|---|
| Epoxy resin (Shell's Epon 828) | 90 |
| Allyl glycidyl ether (reactive diluent) | 10 |
| Diethylene triamine (curing agent) | 10 |
| Red iron oxide powder (fine filler to control flow and hold in a layer on the surface) | 200 |

Other fillers may be used with or instead of iron oxide, e. g., powdered silica flour, talc, plaster of Paris or metal powder but particle size should be sufficiently fine so that the mixture spreads evenly on the model without leaving a granular deposit on the surface. Other curing agents and diluents can be used as known in the art of casting resins.

This composition is thoroughly mixed and applied by brushing or spraying onto the parting and model. The resulting layer may be left until partially cured to a hard tack-free condition at room temperature, or the backing layer may be poured in soon after the facing. By having a faster curing resin at the molding surface than in the resin layer behind it or by partially pre-curing a thin layer on the surface of the mold, the surface sets while the resin behind it is still liquid and the shrinkage of the set material at the molding surface pulls in more liquid as setting progresses in depth from said surface. Thus distortion of the significant surface is avoided. Because of the filler used in the coating layer, it clings to the model as a layer and does not readily mix with the backing mixture, which is subsequently filled into the cavity to form the balance of the pattern.

A backing mixture is then poured onto this facing layer (see 22a of Figure 3). This mixture comprises a fairly coarse sand, e. g., 50 mesh, and an epoxy resin composition, with reactive diluent and curing agent as before. Although one may vary the proportions of epoxy resin composition and sand so that the poured casting composition contains about 65–85% sand and 35–15% epoxy resin composition, I presently prefer to employ a casting composition of the following formula:

| Material: | Parts by weight |
|---|---|
| Epoxy resin (Shell's Epon 828) | 90 |
| Allyl glycidyl ether | 10 |
| Benzyl dimethylamine | 5 |
| 50 mesh sand | 300 |

(Note that the benzyl dimethylamine is a slower curing agent than the diethylene triamine.)

In mixing this casting composition, I seek to entrain among the sand particles fine bubbles of air which may expand as the composition heats up on setting and thereby compensate for resin shrinkage. I find that the presence of the liquid resin facilitates packing of the sand to occupy a minimum volume before curing occurs; and the entrained air present in the voids between grains of the closely packed filler accommodates shrinkage of the resin within the interstices, to that extent avoiding shrinkage of the over-all mass. The sand is important also in thus avoiding overheating during the curing, both by absorbing the exothermic heat of the curing reaction and by improving the thermal conductivity of the mass to carry off such heat from the reaction zone.

Curing is first done by letting the core box set about 2 hours at approximately room temperature and thereafter is heated to about 120° F. and is maintained at such temperature for some 15 hours. By controlling heat dissipation, this heating can be by the exothermic reaction of setting the resin. With the resin composition specified, setting can take place at room temperature.

When one half of the core box is made in this manner, the parting is removed and the surface of the second half with the model in place is treated with wax or other parting agent, as in the case of the parting used for making the first half. The frame 15 is then inverted and the second half cast in the same way that the first was made, as shown in Figure 3, thus welding the completed core box having facing layers 23 and 23a with their respective backings 22 and 22a.

Referring now to Figures 4 through 7, instead of forming a backing by bonded sand, as in the example just described, and absorbing exothermic heat into the sand used in the composition, I have with advantage in some cases used a metal backing 25 formed to approximate the contours of the pattern surface and formed on the face of this backing a layer of the epoxy resin approximately $1/4''$ in thickness, for the usual core boxes. Resin layers approximately $1/16-1/2''$ thick on metal backs have been used with success, but ordinarily the thinnest feasible layer is to be preferred. In this case, the thickness of the epoxy resin layer is important because of the necessity of carrying off into the metal back the exothermic heat produced during the setting reaction.

In this case a parting 17 may be formed around the model and coated with wax or other parting agent as described above. This combined model and parting surface is then supported the proper distance from the metal back 26 and the liquid epoxy resin composition is fed in from the lowest point in the cavity, flowing in and rising gradually to the top of the cavity. The resin composition, as described below, sets at room temperature; and, after the first half of the core box is thus formed, the parting 17 is removed; and the model 11a assembled with the first half 25 of the core box, is then coated with wax or other parting agent and supported the proper distance from the back for forming the second half; after which the epoxy resin composition is flowed in, in the same manner, to complete the lining of the core box.

In order to provide for shrinkage before the resin is fully set and to make maximum utilization of the possibility of flow of the resin while still in the liquid stage, I further provide a series of ports into the cavity, each of which is connected to a down-pour or a riser during the casting of the resin. The down-pour 27, as indicated above, should ordinarily enter at the lowermost point of the cavity in the core box; and additional holes 29 connected to riser pipes 30 are also provided, preferably in the narrower or shallower portions of the cavity. Narrow openings 31 should be provided from the uppermost points for venting air which otherwise would be trapped in the mold.

In this case the metal back 25, 26 is rigid and the resin 33—34 would ordinarily adhere very strongly to it and the shrinkage of the resin during setting would pull the resin away from the true molding surface and give a wholly unsatisfactory product, except for special precautions of the present invention. In order to avoid this, I have provided, as shown in Figs. 5 and 6, a plurality of pads 35 of plasteline, a plastic mixture of clay and light hydrocarbon oil, or other release agents located on small areas spaced apart over the entire area of the metal back. When the shrinkage occurs in the plastic stage of the setting, the resin layer tends to pull away from the backing and these pads, having only slight adhesion for the back and weak cohesion, readily release the resin in their respective areas. If the release pads include a relatively volatile vehicle the vaporization of the vehicle can serve to break what might otherwise be a substantial vacuum in the areas where the resin pulls up from the back. These pad areas should cover from one-third to one-half of the total area of the core box back and will ordinarily be about $3/4''$ long, $1/4''$ wide and not over $1/16''$ thick and spaced about $1/4''$ apart. The back should be otherwise clean so as to obtain full adhesion between that area and the resin layer.

Another convenient way of forming and applying pads is by use of thin strips of sponge rubber or other flexible cellular plastic. These may be about $3/4$ inch wide and $1/16$ to $3/32$ inch thick and coated on the back with a weak pressure-adhesive. These strips can be cut into pieces about $1/4$ inch long and readily placed one after another about $1/4$ inch apart e. g., as indicated in Figure 6 of the drawings. Or, instead of applying separate pieces, a sheet of such cellular sponge material may have narrow pieces punched out of it through which the epoxy resin material will extend and adhere to the metal back, leaving a grid area in which it is released by the sponge. For this purpose it is preferred to use the old-fashioned sponge rubber or other cellular plastic with imperforate cells, rather than pervious sponge material. Still another way of providing the necessary release from the back is to lay a grid over the surface of the metal back and to spray through the grid a liquid parting agent having sufficient vapor pressure so that when the resin facing layer tends to shrink away from the back the vapor of the parting agent will relieve the vacuum and thus minimize distortion of the plastic.

In some cases, particularly where it is desired to have very thin resin facing on the metal back, the back may be drilled with fine holes to allow air to enter through the back and areas over and around each hole coated with silicone grease or other parting agent. Numerous methods of providing for this yielding in small pad areas spaced from one another by areas of bare metal adhesion will thus be made evident to those skilled in the art.

In all cases it is advantageous that the surface of the model and parting should adhere to the resin more strongly than these pad areas, but much less strongly than the areas between the pads.

Although it is desirable to feed through only one downpour, it is possible to feed through several, and one of the advantages of this resin is that it adheres readily to itself, in case one part should have started to set before the other part feeds up to it. In general, however, the pouring should be done so that the entire cavity is filled before any of the material has begun to set.

The location of the down-pours should be such that the resin feeds from thin to heavy sections. This is because heavy sections set up before the thin sections. In this way, and by keeping the down-pours of narrow cross section and exposed to cooling so as to keep down the temperature of the material within them, the setting in the heavier section where the greatest shrinkage would occur is compensated by sucking in of the still-liquid resin material progressively from adjacent sections which have not yet set, and the shrinkage in the last thin sections, as they do set, is compensated by sucking in of the still-liquid resin from the down-pours. To this end the down-pours should be lesser in at least one dimension than the depth of the resin facing on the core box, i. e., less than one-quarter inch in the case described above. To the same end the risers and down-pours are made of metal or other material capable of rapidly dissipating heat so that the liquid resin in them will remain liquid to the last.

As the mold is filled, the additional risers connected to various parts of the mold will be filled likewise; and, as the curing takes place, the still-liquid resin composition can be sucked back from these risers to compensate for shrinkage in those localities. Wherever possible, the down-pour and preferably also the risers should enter the cavity at the edge of the core box or adjacent to gating, as the setting up of the resin in the down-pour may have a tendency to cause distortion in the facing. To this end also it is desirable to cut the risers and down-pours off close to the back as soon as the initial setting has occurred, so that as further shrinkage occurs it can freely draw the plug of resin back toward the facing.

When feeding the resinous composition into the mold cavity it is important that the temperatures of both the molding surfaces and the back be cool enough to avoid too rapid setting. For the resin mentioned above, this means no higher than room temperature and the epoxy resin composition likewise should be no higher than room temperature. Advantageously the liquid epoxy composition is fed slowly into the mold cavity, e. g., taking 15 to 20 minutes per kilogram. The rate, however, should be such that the cavity is completely filled before the composition begins to heat up.

Once the cavtiy is completely filled it is left at room temperature for a period long enough to set up the resin throughout the entire cavity after which the down-pours and risers may be cut off as described above. Thereafter, it is advantageously put into an oven and cured for about 14 hours at a temperature of 110 to 115° F. Alternatively, the mold may be put into an oven as soon as it is filled and heated to a temperature of 110 to 115° F. and then baked until the resin is fully cured; or the entire curing may be without heating except what occurs internally by exothermic reaction. Advantageously, however, the epoxy material after casting should be allowed to set at room temperature at least 4 hours and not more than 8 hours before oven cure. The oven cure should be in the range about 10 to 14 hours.

Although I have found the temperature of 110 to 115° F. most satisfactory, I have used other temperatures with good results up to about 200° F.

The model may be removed from the epoxy facing layers while they are still warm, and this is of advantage since the resin at that temperature is slightly softer and more resilient and therefore there is less possibility of cracking when breaking the adhesion of the facing to the model.

For this facing on a metal back, a composition may be used without filler. Thus, I have found quite satisfactory the following composition:

| Material: | Parts by weight |
|---|---|
| Epoxy casing resin (Shell's Epon 828) | 90 |
| Allyl glycidyl ether | 10 |
| Diethylene triamine | 8 |

The first two materials, the epoxy resin and the allyl glycidyl ether may be mixed together several days before needed. It should, however, be kept in a closed container to prevent the allyl glycidyl ether from evaporating.

The third material, diethylene triamine, is the curing agent and should be mixed into the liquid resin mixture only immediately before use. The pot life of the mixture after the curing agent has been added is about 30 minutes, i. e., at about that time the mixture will begin to heat up and it should not be used thereafter for pouring into the mold. This, however, depends upon room temperature and the quantity of the mix.

Instead of providing release pads scattered on the surface of the metal back, the metal back itself or the parting and model may be supported so as to move freely in response to shrinkage, e. g., by means of a counter balance, the metal back and the parting model being contained within a flask or other suitable enclosure within which the mold parts may move together, their edges being sealed to the flask by plastilene or other means which do not substantially interfere with such movement. After the epoxy liquid has been flowed slowly in to fill the cavity and has adhered to the various parts, the shrinkage, particularly the shrinkage during the plastic flow stage of setting of the resin, will draw the parts together. If desired, the counter balancing weight or other force may be removed when the epoxy resin has set, so that weight e. g., that of the metal backing or of the model and parting will be imposed on the resin to counteract the shrinkage.

For high accuracy in reproduction of the model I prefer to use the mixture of epoxy resin and fine sand in proportion sufficient to give a wet mud capable of flowing readily under pressure and yet having its grains substantially in contact with only a thin film of the liquid resin composition between. A layer ¼ inch thick of this material is spread onto a model and parting as described above, and the metal back is placed on top and pressed against the layer of epoxy material by its own weight, or even with some additional force, while the resin is setting. Whereas the epoxy resin material itself is very fluid and hard to hold in a mold cavity, by thus mixing it with the sand it can be held much more readily in place.

By this technique I have successfully reproduced a 6¼ x 14 inch pattern with accuracy of dimension plus or minus .0007".

For extreme accuracy I have also found that pattern equipment may be made by the various methods described above and sand blasted to remove a very thin layer of the pattern surface approximately equal to the dimensional variations from the model. The model and parting may then be coated with the epoxy liquid as described above with or without a finely divided filler; the resulting facing being of about the same thickness as the resin removed by the sand blasting treatment. The core box or pattern is then fitted together with the coated parting and model and pressed together until the coating has set and cured. The facing will adhere to the sand blasted surface and part from the coated model and parting.

Although the resins are not equivalent to the epoxy resin used above, I have found that other casting resins found useful for potting electrical equipment can be used for foundry pattern equipment if the shrinkage is controlled by the present invention. Many such resins are known, especially polyester type resins, phenolic type resins and methyl methacrylate resins. Deserving of special mention among these is Vibrin, a product of Naugatuck Chemical Company.

I claim:

1. The method of controlling shrinkage in setting resin composition which comprises mixing the liquid resin-forming material with a granular filler until the individual grains of the filler are coated with the liquid and the interstices between grains have air bubbles surrounded by the liquid, setting the resin and while the composition is still plastic heating it to compensate for shrinkage in the resin by thermal expansion of the bubbles.

2. The method of controlling shrinkage in a thermosetting epoxy resin composition which comprises mixing the liquid resin-forming material with sand until the individual grains of the filler are coated with the liquid and the interstices between sand grains have air bubbles surrounded by the liquid, setting the resin and while the composition is still plastic heating it to compensate for shrinkage in the resin by thermal expansion of the bubbles.

3. The method of controlling setting of a resin composition which comprises mixing with an epoxy settable casting resin a granular filler having heat capacity between room temperature and 200° C. at least equal to the exothermic heat of the setting reaction.

4. The method of making from a model a permanent mold for forming of metal casting molds which comprises forming a parting fitted to said model and providing a parting surface extending laterally from a predetermined parting line on said model, making a viscous mixture of finely divided filler and a settable liquid epoxy resin, applying a coat of said mixture over the exposed molding face of the model and the parting surface around it, setting the resin of said coat to a solid condition, backing said pre-set coat with an epoxy resin composition, setting said backing substantially later than said coating, curing the composite permanent mold comprised of coat and backing and removing it from the model and parting.

5. The method of making a core box from a model which comprises forming a parting fitted to said model and providing a parting surface extending laterally from a predetermined parting line on said model, making a viscous mixture of finely divided filler and a settable liquid epoxy resin, applying a coat of said mixture over the exposed molding face of the model and the parting surface around it, setting the resin of said coat to a solid condition, backing said pre-set coat with an epoxy resin composition, setting said backing substantially later than said coating, curing the composite core box part comprised of coat and backing, and removing it from the model and parting.

6. The method as defined in claim 5 in which said coat is not set to a solid condition before applying the backing.

7. The method as defined in claim 5 in which the backing composition comprises a coarser granular filler than that in the face coat.

8. The method of casting a liquid thermo-setting casting resin which sets by an exothermic reaction with accompanying shrinkage which comprises filling a mold cavity with the liquid by flowing it into the deeper parts of the cavity through the shallower parts thereof and into the shallower parts of the cavity through narrow channels connected therewith, whereby the resin heats up most rapidly and sets first in said deeper parts while the shallower parts remain liquid, and progressively through the mold cavity to the inlet, and shrinkage which occurs during setting and curing is compensated by inflow of liquid material from adjacent areas in which setting has not yet occurred.

9. The method of controlling shrinkage in an epoxy casting resin composition being cast between a molding surface and a backing surface, which comprises treating said backing surface with a release agent effecting non-adherence of said resin to at least a substantial area of said backing surface, casting said resin composition on said molding surface effecting adhesion thereof to said molding surface, said adhesion being less than the cohesion of said composition when cured, setting said composition against said molding surface, said release agent on said backing member effecting release of said casting composition therefrom for shrinkage toward said molding surface of at least a portion of the surface of said cast composition opposite to said molding surface.

10. The method of controlling shrinkage in an epoxy casting resin composition which comprises treating the face of a model with a release agent which does not wholly avoid adhesion by the epoxy resin, forming a rigid backing member to fit against said model with a surface approximating the contours of said face but uniformly spaced therefrom a distance about 1/16–3/8 inch, treating said backing surface in alternate adjacent areas distributed thereover with a release agent to which the epoxy resin adheres less strongly than to the treated face of the model, leaving intervening areas substantially clean for adhesion by the epoxy resin, fitting said backing member over said treated face to enclose a mold cavity therebetween, filling said cavity with the casting resin composition, and setting said resin, whereby the shrinkage which occurs during setting is accommodated by pulling the resin composition away from the backing member at said areas treated with said release agent while the areas between said treated areas hold said resin more strongly than the model face.

11. The method as defined in claim 10, in which the release areas are covered with thin pads of modelling clay.

12. The method as defined in claim 10, in which the relase areas are covered with thin pads of impervious cellular plastic.

13. The method as defined in claim 10, in which the release areas are covered with thin pads of impervious sponge rubber.

14. Pattern equipment for making of molds and cores, for metal casting which comprises a molded epoxy resin facing and a rigid backing.

15. Pattern equipment for making of molds and cores, for metal casting which comprises a molded composition of sand bonded with an epoxy resin.

16. Pattern equipment for making of molds and cores for metal casting which comprises a molded facing of epoxy resin composition and an integral backing of a composition of epoxy resin and sand.

17. Pattern equipment for making of molds and cores for metal casting which comprises a molded facing of epoxy resin composition and an integral backing of a composition of epoxy resin and round grain filler.

18. Pattern equipment for making of molds and cores for metal casting which comprises a facing coat of epoxy resin and a finely divided filler and an integral backing of epoxy resin and a coarser granular filler.

19. Pattern equipment for making of molds and cores, for metal casting which comprises a facing coat of epoxy resin and a finely divided filler and an integral backing layer of epoxy resin and a metal back to which said backing layer is adherent.

References Cited in the file of this patent

UNITED STATES PATENTS

| | | |
|---|---|---|
| 805,144 | Kuller | Nov. 21, 1905 |
| 850,168 | Marsteller | Apr. 16, 1907 |
| 872,978 | Taggart | Dec. 3, 1907 |
| 1,303,097 | Menefee | May 6, 1919 |
| 1,644,368 | Copeman | Oct. 4, 1927 |
| 2,306,516 | Zahn | Dec. 29, 1942 |
| 2,379,218 | Dial et al. | June 26, 1945 |
| 2,409,633 | Kropa | Oct. 22, 1946 |
| 2,434,780 | Wiss et al. | Jan. 20, 1948 |
| 2,454,910 | Carr | Nov. 30, 1948 |
| 2,528,932 | Wiles et al. | Nov. 7, 1950 |
| 2,635,294 | Rolaston | Apr. 21, 1953 |

OTHER REFERENCES

Modern Plastics, November 1950, pages 85–88, inclusive.